United States Patent
Jiang

(10) Patent No.: US 11,711,864 B2
(45) Date of Patent: Jul. 25, 2023

(54) NETWORK CONNECTION METHOD AND DEVICE

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 136 days.

(21) Appl. No.: 16/824,002

(22) Filed: Mar. 19, 2020

(65) Prior Publication Data

US 2020/0221524 A1  Jul. 9, 2020

Related U.S. Application Data

(63) Continuation of application No. PCT/CN2017/102763, filed on Sep. 21, 2017.

(51) Int. Cl.
*H04W 76/18* (2018.01)
*H04W 48/06* (2009.01)

(52) U.S. Cl.
CPC .......... *H04W 76/18* (2018.02); *H04W 48/06* (2013.01)

(58) Field of Classification Search
CPC ..... H04W 76/18; H04W 48/06; H04W 76/19; H04W 76/27; H04W 12/10; H04W 48/04; Y02D 30/70
See application file for complete search history.

(56) References Cited

U.S. PATENT DOCUMENTS

| 2015/0094079 A1 | 4/2015 | Palat et al. |
| 2017/0202047 A1 | 7/2017 | Tiwari et al. |
| 2017/0339612 A1 | 11/2017 | Quan et al. |
| 2019/0021128 A1 | 1/2019 | Sivavakeesar |
| 2019/0246318 A1* | 8/2019 | Kim ...................... H04W 48/08 |
| 2019/0289620 A1* | 9/2019 | Zhang ................... H04W 74/08 |
| 2019/0320485 A1* | 10/2019 | Kim ...................... H04W 76/25 |
| 2020/0029206 A1* | 1/2020 | Zhang ................... H04W 12/06 |
| 2020/0187144 A1* | 6/2020 | Ying ..................... H04W 48/04 |
| 2020/0214070 A1* | 7/2020 | Ingale ............... H04W 74/0833 |
| 2021/0029581 A1* | 1/2021 | Kim ...................... H04W 76/19 |

FOREIGN PATENT DOCUMENTS

| CN | 101562848 A | 10/2009 |
| CN | 106332308 A | 1/2017 |
| CN | 106658758 A | 5/2017 |

(Continued)

OTHER PUBLICATIONS

Supplementary European Search Report in the European Application No. 17926155.7, dated Aug. 21, 2020.

(Continued)

*Primary Examiner* — Faruk Hamza
*Assistant Examiner* — Aixa A Guadalupe Cruz
(74) *Attorney, Agent, or Firm* — Finnegan, Henderson, Farabow, Garrett & Dunner, L.L.P.

(57) ABSTRACT

A method for implementing network connection, applied to a base station, includes: receiving a connection resume request message sent by user equipment (UE); detecting, according to the connection resume request message, that at least one rejection cause of rejecting connection resumption is met; and sending a connection resume reject message to the UE, wherein the connection resume reject message carries a cause value indicating the at least one rejection cause.

12 Claims, 13 Drawing Sheets

(56) References Cited

FOREIGN PATENT DOCUMENTS

| CN | 106961748 A | 7/2017 |
|----|----|----|
| CN | 107046735 A | 8/2017 |
| EP | 2 645 769 A1 | 10/2013 |
| EP | 3 193 557 A1 | 7/2017 |
| WO | WO 2016177152 A1 | 11/2016 |
| WO | WO 2017/119723 A1 | 7/2017 |
| WO | WO 2017/122588 A1 | 7/2017 |
| WO | WO 2017/133678 A1 | 8/2017 |

OTHER PUBLICATIONS

International Search Report in the International Application No. PCT/CN2017/102763, dated May 30, 2018.
English translation of the Written Opinion of the International Search Authority in the International Application No. PCT/CN2017/102763, dated May 30, 2018.
First Office Action dated Dec. 16, 2021, from the State Intellectual Property Office of the People's Republic of China, issued in Chinese Application No. 201780001433.0.
LG Electronics Inc., "The reject procedure of RRC connection resume request in solution 18", 3GPP TSG-RAN2 Meeting #93, R2-162938, Dubrovnik, Croatia, Apr. 11-15, 2016, 2 pgs.
Second Office Action of Chinese Application No. 201780001433.0, dated May 5, 2022.
XIAOMI: "Consideration on the triggers of transiting UE from INACTIVE to Idle", 3GPP TSG-RAN NR #2, R2-1709169, Resubmitted R2-1707458, Qingdao, China, Jun. 27-29, 2017, 6 pages.
Office Action of European Application No. 17926155.7, dated Feb. 1, 2023.

* cited by examiner

NETWORK CONNECTION METHOD AND DEVICE

CROSS-REFERENCE TO RELATED APPLICATIONS

The present application is a continuation of International Application PCT/CN2017/102763, filed on Sep. 21, 2017, the content of which is hereby incorporated by reference in its entirety.

TECHNICAL FIELD

The disclosure relates to the technical field of communication, and particularly to a network connection method and device.

BACKGROUND

With development of communication technologies, there have been increased requirements on user equipment (UE) and base stations. In related art, after receiving a connection resume request message sent by UE, a base station may simply send the UE a rejection to reject resuming a connection. After receiving the rejection, the UE may not be able to perform a proper operation due to a failure to interpret the rejection sent by the base station, leading to waste of resources of the UE, and increasing power consumption by the UE.

SUMMARY

According to a first aspect, a method for implementing network connection, applied to a base station, includes: receiving a connection resume request message sent by user equipment (UE); detecting, according to the connection resume request message, that at least one rejection cause of rejecting connection resumption is met; and sending a connection resume reject message to the UE, wherein the connection resume reject message carries a cause value indicating the at least one rejection cause.

According to a second aspect, a method for implementing network connection, applied to user equipment (UE), includes: sending a connection resume request message to a base station; receiving a connection resume reject message sent by the base station, wherein the connection resume reject message carries a cause value indicating a rejection cause that causes the base station to reject the connection resume request message; and performing a processing operation corresponding to the connection resume reject message.

According to a third aspect, a base station includes: a processor; and a memory storing instructions executable by the processor. The processor is configured to: receive a connection resume request message sent by user equipment (UE); detect, according to the connection resume request message, that at least one rejection cause of rejecting connection resumption is met; and send a connection resume reject message to the UE, wherein the connection resume reject message carries a cause value indicating the at least one rejection cause.

According to a fourth aspect, user equipment (UE) includes: a processor; and a memory storing instructions executable by the processor. The processor is configured to: send a connection resume request message to a base station; receive a connection resume reject message sent by the base station, wherein the connection resume reject message carries a cause value indicating a rejection cause that causes the base station to reject the connection resume request message; and perform a processing operation corresponding to the connection resume reject message.

The technical solution provided by embodiments of the present disclosure includes beneficial effects as follows.

In the embodiments, a base station receives a connection resume request message sent by UE. The base station detects, according to the connection resume request message, that at least one rejection cause of rejecting connection resumption is met. The base station then sends a connection resume reject message to the UE. The connection resume reject message carries a cause value indicating a rejection cause that causes the base station to reject the connection resume request message. Accordingly, the UE may learn, according to the connection resume reject message, the rejection cause that causes the base station to reject the connection resume request message, such that the UE can interpret the rejection sent by the base station and perform a proper operation accordingly, improving security of the network connection, as well as reducing power consumption by the UE.

In the embodiments, UE sends a connection resume request message to a base station. The UE receives a connection resume reject message sent by the base station. The connection resume reject message carries a cause value indicating a rejection cause that causes the base station to reject the connection resume request message. The UE performs a processing operation corresponding to the connection resume reject message. Accordingly, the UE may learn, according to the connection resume reject message, the rejection cause that causes the base station to reject the connection resume request message, such that the UE can interpret the rejection sent by the base station and perform a proper operation accordingly, improving security of the network connection, as well as reducing power consumption by the UE.

The above general description and the detailed description below are exemplary and explanatory, and do not limit the disclosure.

BRIEF DESCRIPTION OF THE ACCOMPANYING DRAWINGS

The accompanying drawings are incorporated in and constitute part of the disclosure, illustrate embodiments of the disclosure, and together with the specification, serve to explain the principle of the disclosure.

DETAILED DESCRIPTION

Reference will now be made to exemplary embodiments, examples of which are illustrated in the accompanying drawings. The following description refers to the accompanying drawings in which the same numbers in different drawings represent the same or similar elements unless otherwise represented. Implementations set forth in the following exemplary embodiments do not represent all implementations consistent with the disclosure. Rather, they are merely examples of devices and methods related to certain aspects of the disclosure as recited in the accompanying claims.

Terms used in the disclosure are for describing exemplary embodiments instead of limiting the disclosure. For example, the term "and/or" used in the disclosure refers to and includes any or all possible combinations of one or more associated items listed. The terms such as "first," "second," "third" may be adopted to describe various kinds of information, such information should not be limited to such a term. For example, without departing from the scope of the embodiments herein, first information may also be referred to as second information. Similarly, second information may also be referred to as first information. Depending on the context, the term "if" as used herein may be interpreted as "when" or "while" or "in response to determining that."

Figure 1:
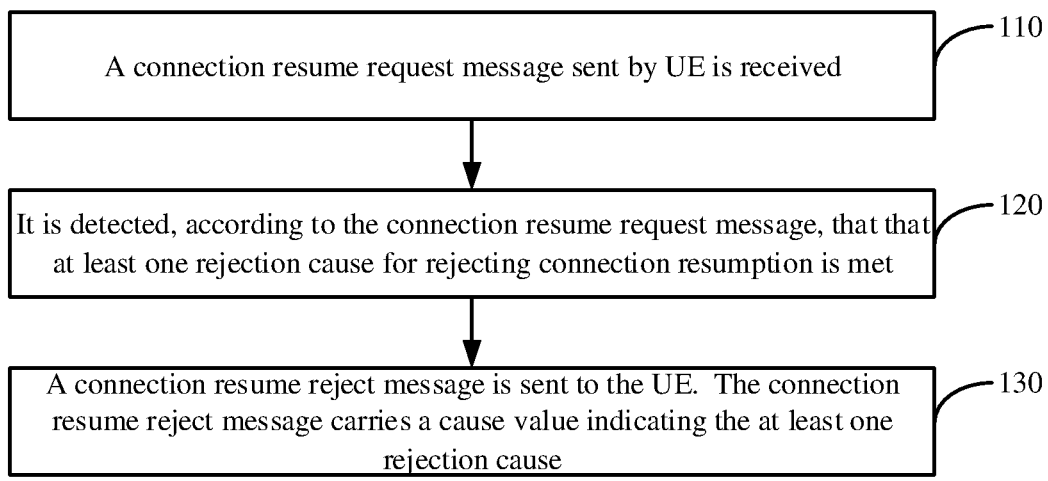
FIG. 1 is a flowchart of a method for implementing network connection according to an exemplary embodiment.
Figure 2:
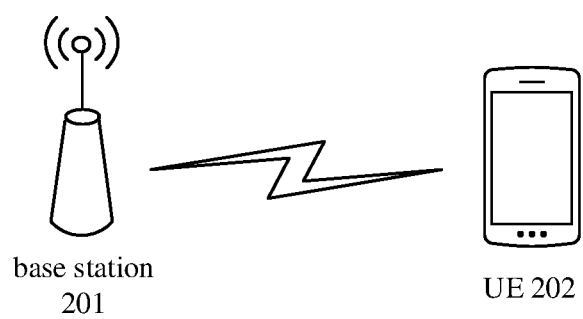
FIG. 2 is a schematic diagram of a scene of a method for implementing network connection according to an exemplary embodiment.

FIG. 1 is a flowchart of a method for implementing network connection according to an exemplary embodiment. FIG. 2 is a schematic diagram of a scene of the method for implementing network connection according to an exemplary embodiment. The method for implementing network connection may apply to a base station. As shown in FIG. 1, the method for implementing network connection may include steps 110-130 as follows.

In step 110, a connection resume request message sent by UE is received.

In an embodiment, the UE may be in an inactive state. The inactive state may be a state in a 5th Generation (5G) mobile communication technology network.

If the UE is in the inactive state, both the base station and the UE may save a context of the UE. A cell selection/reselection mechanism may be adopted for UE mobility. The UE may send and receive a small packet service straightforwardly in the inactive state without entering a connected state, thereby lowering power consumption by the UE, saving a signaling overhead.

In an embodiment, the UE in the inactive state may send a connection resume request message to the base station, when accessing a new Radio Access Network based Notification Area (RNA), or triggering a Radio Access Network Location Area Update (RLAU) at periodic location update, or sending and receiving signaling/data. The connection resume request message may be used by the UE to resume a Radio Resource Control (RRC) connection, or perform the RLAU, or send and receive signaling/data in the inactive state.

In step 120, it is detected, according to the connection resume request message, that at least one rejection cause of rejecting connection resumption is met.

In an embodiment, after receiving the connection resume request message sent by the UE, the base station may reject the request of the UE based on one or more rejection causes. For example, the rejection causes may include: the connection resume request message fails to pass message integrity check, an RNA that the UE requests to access may prohibit access by the UE, a network may be overloaded, a context of the UE may fail to be acquired and the network may be overloaded, etc.

In step 130, a connection resume reject message is sent to the UE. The connection resume reject message carries a cause value indicating the at least one rejection cause.

When rejecting the request of the UE, the base station may inform the UE of a rejection cause through a connection resume reject message.

For example, the base station may reject the request of the UE based on a rejection cause that the connection resume request message fails to pass message integrity check, indicated using a cause value such as "integrity check failure."

For example, the base station may reject the request of the UE based on a rejection cause that an RNA that the UE requests to access prohibits access by the UE, indicated using a cause value such as "area is not allowed."

For example, the base station may reject the request of the UE based on a rejection cause that the network is overloaded, indicated using a cause value such as "overload."

For example, the base station may reject the request of the UE based on a rejection cause that a context of the UE fails to be acquired and the network is overloaded, indicated using a cause value such as "no UE context & overload."

As shown in FIG. 2, an exemplary scene may include a base station 201 and UE 202. When accessing a new RNA, or triggering an RLAU at periodic location update, or sending and receiving signaling/data, UE 202 in the inactive state may send a connection resume request message to the base station 201. After receiving the connection resume request message sent by the UE 202, and detecting that one or more rejection causes of rejecting connection resumption are met, the base station 201 may send a connection resume reject message to the UE 202. The connection resume reject message may carry a cause value indicating a rejection cause that causes the base station 201 to reject the connection resume request message.

In the embodiment, the base station receives a connection resume request message sent by the UE. The base station detects, according to the connection resume request message, that at least one rejection cause of rejecting connection resumption is met. The base station then sends a connection resume reject message to the UE. The connection resume reject message carries a cause value indicating a rejection cause that causes the base station to reject the connection resume request message. Accordingly, the UE may learn, according to the connection resume reject message, the rejection cause that causes the base station to reject the connection resume request message, such that the UE can interpret the rejection sent by the base station and perform a proper operation accordingly, improving security of the network connection, as well as reducing power consumption by the UE.

In an embodiment, the at least one rejection cause may include, but is not limited to, at least one of a first rejection cause, a second rejection cause, a third rejection cause, or a fourth rejection cause. The first rejection cause may represent a failure in integrity check on the connection resume request message. The second rejection cause may represent that an RNA that the UE requests to access prohibits access by the UE. The third rejection cause may represent a network overload. The fourth rejection cause may represent a failure to acquire a UE context and the network overload.

In the embodiment, the base station may reject the request of the UE based on one or more of the first rejection cause, the second rejection cause, the third rejection cause or the fourth rejection cause. Accordingly, after receiving the connection resume reject message, the UE may learn the rejection cause why the request is rejected according to the cause value carried in the connection resume reject message, such that the UE can perform a respective processing operation corresponding to the respective rejection cause, improving efficiency of the network connection.

In an embodiment, the connection resume reject message sent to the UE by the base station may further include a UE state indicated by the base station. The UE state may be an idle state or an inactive state. If the UE is in the idle state, neither the base station nor the UE may save a context of the UE. The UE in the idle state may not receive and send data straightforwardly. The UE state indicated by the base station may be configured for the UE by the base station. After receiving the UE state indicated by the base station, the UE can switch from a current state to the UE state indicated by the base station, regardless of the current state the UE is in.

In the embodiment, the connection resume reject message sent to the UE by the base station may further include the UE state indicated by the base station, such that the UE is allowed to adjust a current state as indicated by the base station, improving reliability of the network connection.

In an embodiment, the connection resume reject message sent to the UE by the base station may further include, but is not limited to, at least one of various kinds of information as follows.

The connection resume reject message may include a wait time (waitTime) indicated by the base station. The wait time may be a time elapse before the UE resends the connection resume request message to the base station.

The connection resume reject message may include setting of a lowest reselection priority (deprioritisationRequest) indicated by the base station. The setting may include setting the lowest reselection priority for reselecting a frequency/standard of a cell where the UE is camping, or not setting the lowest reselection priority for reselecting a frequency/standard of a cell where the UE is camping.

The connection resume reject message may include a priority of reselecting a respective frequency (idleinactiveMobilityControl) indicated by the base station. The respective frequency may be a distinct frequency configured for the UE by the base station.

The connection resume reject message may include a redirection frequency (redirectedCarrierInfo) indicated by the base station. The redirection frequency may be a frequency to which the UE is to be redirected.

The connection resume reject message may include a redirection cell (cellInfoList) indicated by the base station. The redirection cell may be a cell covered by the frequency to which the UE is to be redirected.

The connection resume reject message may include RNA information indicated by the base station. The RNA information may include a cell or area indicated by the base station.

In the embodiment, the connection resume reject message sent to the UE by the base station may further include one or more other indications, such that the UE can perform a processing operation corresponding to a respective indication received, thereby improving practicality of the network connection.

Figure 3:
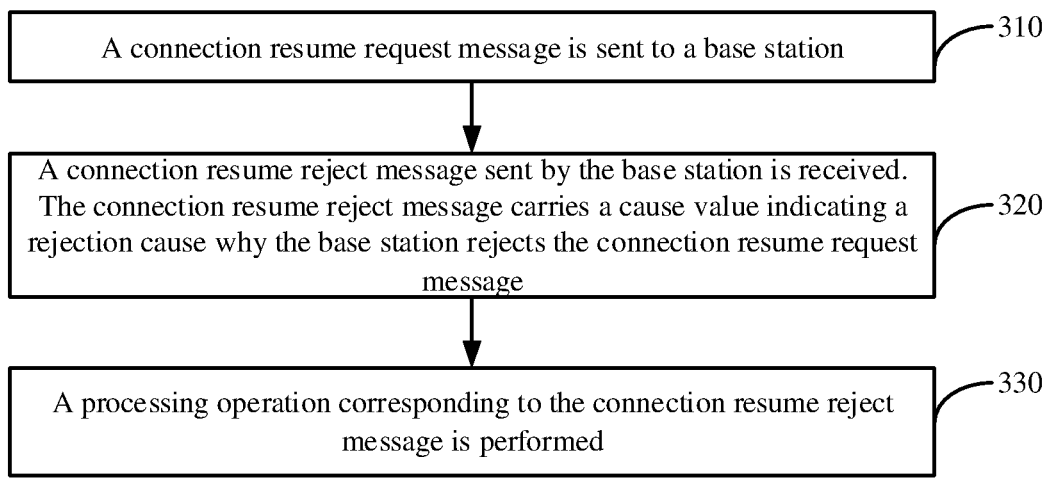
FIG. 3 is a flowchart of a method for implementing network connection according to an exemplary embodiment.

FIG. 3 is a flowchart of a method for implementing network connection according to an exemplary embodiment. The method for implementing network connection may apply to UE. As shown in FIG. 3, the method for implementing network connection may include steps 310-330 as follows.

In step 310, a connection resume request message is sent to a base station.

In an embodiment, the UE may be in an inactive state. When accessing a new RNA, or triggering an RLAU at periodic location update, or sending and receiving signaling/data, the UE may send a connection resume request message to the base station.

In step 320, a connection resume reject message sent by the base station is received. The connection resume reject message carries a cause value indicating a rejection cause that causes the base station to reject the connection resume request message.

After receiving a connection resume reject message sent by the base station, the UE may learn, according to the connection resume reject message, that the base station has rejected the request by the UE to resume a connection. The UE may learn a rejection cause that causes the base station to reject the connection resume request message according to a cause value carried by the connection resume reject message.

For example, the cause value carried by the connection resume reject message may be "integrity check failure," which indicates that the base station has rejected the request of the UE because the connection resume request message fails to pass message integrity check.

For example, the cause value carried by the connection resume reject message may be "area is not allowed," which indicates that the base station has rejected the request of the UE because an RNA that the UE requests to access prohibits access by the UE.

For example, the cause value carried by the connection resume reject message may be "overload," which indicates that the base station has rejected the request of the UE because the network is overloaded.

For example, the cause value carried by the connection resume reject message may be "no UE context & overload," which indicates that the base station has rejected the request of the UE because a context of the UE fails to be acquired and the network is overloaded.

In step 330, a processing operation corresponding to the connection resume reject message is performed.

The UE may interpret the rejection by the base station according to the connection resume reject message, and may perform a processing operation accordingly.

For example, the UE may learn that the base station has rejected the request of the UE because that the network is overloaded. Accordingly, the UE may wait for a period of time, and then resend the connection resume request message to the base station.

In the embodiment, the UE sends a connection resume request message to the base station. The UE receives a connection resume reject message sent by the base station. The connection resume reject message carries a cause value indicating a rejection cause that causes the base station to reject the connection resume request message. The UE performs a processing operation corresponding to the connection resume reject message. Accordingly, the UE may learn, according to the connection resume reject message, the rejection cause that causes the base station to reject the connection resume request message, such that the UE can interpret the rejection sent by the base station and perform a proper operation accordingly, improving security of the network connection, as well as reducing power consumption by the UE.

In an embodiment, the rejection cause that causes the base station to reject the connection resume request message may include, but is not limited to, at least one of a first rejection cause, a second rejection cause, a third rejection cause, or a fourth rejection cause. The first rejection cause may represent a failure in integrity check on the connection resume request message. The second rejection cause may represent that an RNA that the UE requests to access prohibits access by the UE. The third rejection cause may represent a network overload. The fourth rejection cause may represent a failure to acquire a UE context and the network overload.

In the embodiment, the base station may reject the request of the UE based on one or more of the first rejection cause, the second rejection cause, the third rejection cause or the fourth rejection cause, such that the UE can perform a processing operation corresponding to the respective rejection cause, improving efficiency of the network connection.

In an embodiment, the connection resume reject message sent by the base station may further include a UE state indicated by the base station. The UE state may be an idle state or an inactive state. Accordingly, step 330 may include adjusting a current state of the UE to be the UE state indicated by the base station. In this way, the UE is allowed to adjust a current state as indicated by the base station. If the UE state indicated by the base station is the inactive state, and the current state of the UE is also the inactive state, the UE may stay in the inactive state. If the UE state indicated by the base station is the idle state, and the current state is the inactive state, the UE may switch from the inactive state to the idle state.

In the embodiment, if the connection resume reject message sent by the base station includes a UE state indicated by the base station, the UE may adjust a current state as indicated by the base station, thereby improving reliability of the network connection.

In an embodiment, the rejection cause that causes the base station to reject the connection resume request message may include at least one of the first rejection cause or the fourth rejection cause. Accordingly, step 330 may include adjusting a current state of the UE to be an idle state. In this way, the UE itself may adjust the state by default. That is, the base station does not have to indicate a UE state. Rather, the UE itself may directly adjust the current state to be an idle state, as long as the rejection cause includes the first rejection cause or the fourth rejection cause.

In the embodiment, the UE may simply adjust the current state to be an idle state when the rejection cause is at least one of the first rejection cause or the fourth rejection cause, without requiring the base station to indicate a target UE state, thus saving signaling overhead.

In an embodiment, the connection resume reject message sent by the base station may further include RNA information indicated by the base station. The RNA information may include a cell or area indicated by the base station. Accordingly, step 330 may include saving the RNA information. The cell or area indicated by the base station may be excluded from consideration in cell reselection. In this way, the UE may set a cell or area indicated by the base station as being prohibited, and deem such a prohibited cell or area unsuitable in cell reselection.

In the embodiment, the connection resume reject message sent by the base station may include RNA information indicated by the base station. The RNA information may include a cell or area indicated by the base station. The UE may then save the RNA information indicated by the base station, and exclude the cell or area indicated by the base station from consideration in cell reselection, thereby avoiding use of a cell or area indicated by the base station in cell reselection, improving reliability of cell reselection.

In an embodiment, the connection resume reject message sent by the base station may further include a wait time indicated by the base station. The wait time may be a time elapse before the UE resends the connection resume request message to the base station. Accordingly, step 330 may include resending the connection resume request message to the base station after expiration of the wait time indicated by the base station.

In the embodiment, the connection resume reject message sent by the base station may include a wait time indicated by the base station. The UE may then resend the connection resume request message to the base station after expiration of the wait time indicated by the base station, such that the base station controls the frequency the UE sends the connection resume request message, avoiding a dilemma that the UE constantly sends connection resume request messages without actually resuming the connection, avoiding waste of resources of the UE, and lowering power consumption by the UE.

In an embodiment, step 330 may include deleting the connection resume reject message, and maintaining an inactive state as a current state in response to at least one of a failure in integrity check on the connection resume reject message or a failure to decrypt the connection resume reject message. In this way, the UE may further inform a local Non-Access Stratum (NAS) of the integrity check failure. The UE may further go on and wait a message from the base station, or send another connection resume request message to the base station.

In the embodiment, the UE may delete the connection resume reject message and maintain an inactive state as a current state in response to at least one of a failure in integrity check on the connection resume reject message or a failure to decrypt the connection resume reject message, such that the UE can send another connection resume request message to a base station, improving efficiency of the network connection.

In an embodiment, step 330 may further include, after the current state has been adjusted to be an idle state, sending a notification to a local NAS. The notification may include that the current state is the idle state. The notification may include the cause value indicating the rejection cause that causes the base station to reject the connection resume request message. In this way, having returned to the idle state, the UE may send the local NAS a notification. The UE does not have to notify the local NAS if the UE remains in the inactive state.

In the embodiment, after the current state has been adjusted to be an idle state, a notification may be sent to a local NAS. The notification may include that the current state is the idle state. The notification may include the cause value indicating the rejection cause that causes the base station to reject the connection resume request message. Accordingly, the local NAS may learn according to the notification message that the current state is the idle state, and the rejection cause that causes the base station to reject the connection resume request message, thereby improving reliability of the network connection.

The present disclosure also provides devices for implementing network connection, corresponding to the above described methods for implementing network connection.

Figure 4:
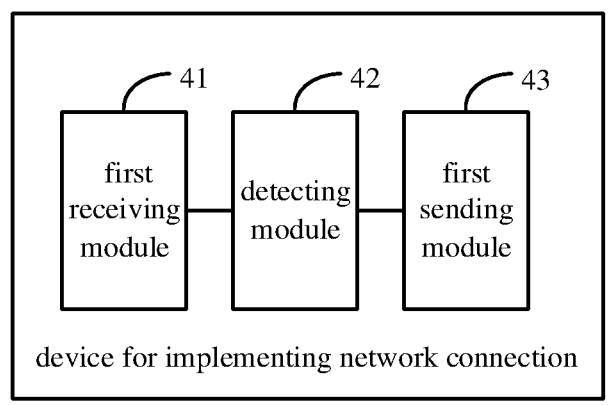
FIG. 4 is a block diagram of a device for implementing network connection according to an exemplary embodiment.

FIG. 4 is a block diagram of a device for implementing network connection according to an exemplary embodiment. The device may apply to a base station. The device may be perform the method for implementing network connection as shown in FIG. 1. As shown in FIG. 4, the device for implementing network connection may include a first receiving module 41, a detecting module 42, and a first sending module 43.

The first receiving module 41 may be configured to receive a connection resume request message sent by UE.

The detecting module 42 may be configured to detect, according to the connection resume request message, that at least one rejection cause of rejecting connection resumption is met.

The first sending module 43 may be configured to send a connection resume reject message to the UE. The connection resume reject message may carry a cause value indicating the at least one rejection cause.

In the embodiment, the base station receives a connection resume request message sent by the UE. The base station detects, according to the connection resume request message, that at least one rejection cause of rejecting connection resumption is met. The base station then sends a connection resume reject message to the UE. The connection resume reject message carries a cause value indicating a rejection cause that causes the base station to reject the connection resume request message. Accordingly, the UE may learn, according to the connection resume reject message, the rejection cause that causes the base station to reject the connection resume request message, such that the UE can interpret the rejection sent by the base station and perform a proper operation accordingly, improving security of the network connection, as well as reducing power consumption by the UE.

In an embodiment, the at least one rejection cause detected by the detecting module 42 may include at least one of a first rejection cause, a second rejection cause, a third rejection cause, or a fourth rejection cause. The first rejection cause may represent a failure in integrity check on the connection resume request message. The second rejection cause may represent that an RNA that the UE requests to access prohibits access by the UE. The third rejection cause may represent a network overload. The fourth rejection cause may represent a failure to acquire a UE context and the network overload.

In the embodiment, the base station may reject the request of the UE based on one or more of a first rejection cause, a second rejection cause, a third rejection cause or a fourth rejection cause. Accordingly, after receiving the connection resume reject message, the UE may learn the rejection cause why the request is rejected according to the cause value carried in the connection resume reject message, such that the UE can perform a respective processing operation corresponding to the respective rejection cause, improving efficiency of the network connection.

In an embodiment, the connection resume reject message sent to the UE by the first sending module 43 may further include a UE state indicated by the base station. The UE state may be an idle state or an inactive state.

In the embodiment, the connection resume reject message sent to the UE by the base station may further include a UE state indicated by the base station, such that the UE is allowed to adjust a state per se as indicated by the base station, improving reliability of the network connection.

In an embodiment, the connection resume reject message sent to the UE by the first sending module 43 may further include, but is not limited to, at least one of various kinds of information as follows.

The connection resume reject message may include a wait time (waitTime) indicated by the base station. The wait time may be a time elapse before the UE resends the connection resume request message to the base station.

The connection resume reject message may include setting of a lowest reselection priority (deprioritisationRequest) indicated by the base station. The setting may include setting the lowest reselection priority for reselecting a frequency/standard of a cell where the UE is camping, or not setting the lowest reselection priority for reselecting a frequency/standard of a cell where the UE is camping.

The connection resume reject message may include a priority of reselecting a respective frequency (idleinactive-MobilityControl) indicated by the base station. The respective frequency may be a distinct frequency configured for the UE by the base station.

The connection resume reject message may include a redirection frequency (redirectedCarrierInfo) indicated by the base station. The redirection frequency may be a frequency to which the UE is to be redirected.

The connection resume reject message may include a redirection cell (cellInfoList) indicated by the base station. The redirection cell may be a cell covered by the frequency to which the UE is to be redirected.

The connection resume reject message may include RNA information indicated by the base station. The RNA information may include a cell or area indicated by the base station.

In the embodiment, the connection resume reject message sent to the UE by the base station may further include one or more other indications, such that the UE can perform a respective processing operation corresponding to a respective indication received, thereby improving practicality of the network connection.

Figure 5:
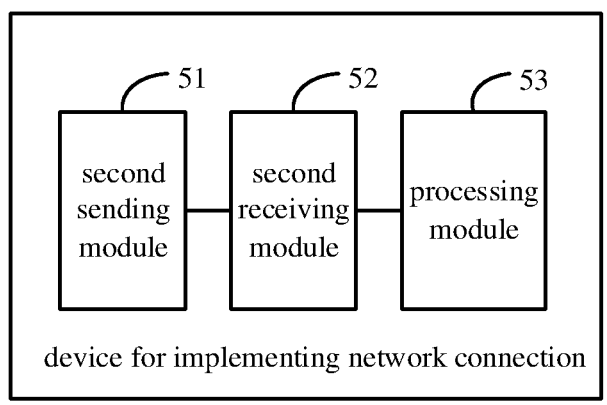
FIG. 5 is a block diagram of a device for implementing network connection according to an exemplary embodiment.

FIG. 5 is a block diagram of a device for implementing network connection according to an exemplary embodiment. The device may apply to UE. The device may be configured to perform the method for implementing network connection as shown in FIG. 3. As shown in FIG. 5, the device for implementing network connection may include a second sending module 51, a second receiving module 52, and a processing module 53.

The second sending module 51 may be configured to send a connection resume request message to a base station.

The second receiving module 52 may be configured to receive a connection resume reject message sent by the base station. The connection resume reject message may carry a cause value indicating a rejection cause that causes the base station to reject the connection resume request message.

The processing module 53 may be configured to perform a processing operation corresponding to the connection resume reject message.

In the embodiment, the UE sends a connection resume request message to the base station. The UE receives a connection resume reject message sent by the base station. The connection resume reject message carries a cause value indicating a rejection cause that causes the base station to reject the connection resume request message. The UE performs a processing operation corresponding to the connection resume reject message. Accordingly, the UE may learn, according to the connection resume reject message, the rejection cause that causes the base station to reject the connection resume request message, such that the UE can interpret the rejection sent by the base station and perform a proper operation accordingly, improving security of the network connection, as well as reducing power consumption by the UE.

In an embodiment, the rejection cause that causes the base station to reject the connection resume request message, as received by the second receiving module 52, may include at least one of a first rejection cause, a second rejection cause, a third rejection cause, or a fourth rejection cause. The first rejection cause may represent a failure in integrity check on the connection resume request message. The second rejection cause may represent that an RNA that the UE requests to access prohibits access by the UE. The third rejection cause may represent a network overload. The fourth rejection cause may represent a failure to acquire a UE context and the network overload.

In the embodiment, the base station may reject the request of the UE based on one or more of the first rejection cause, the second rejection cause, the third rejection cause or the fourth rejection cause, such that the UE can perform a respective processing operation corresponding to the respective rejection cause, improving efficiency of the network connection.

Figure 6:
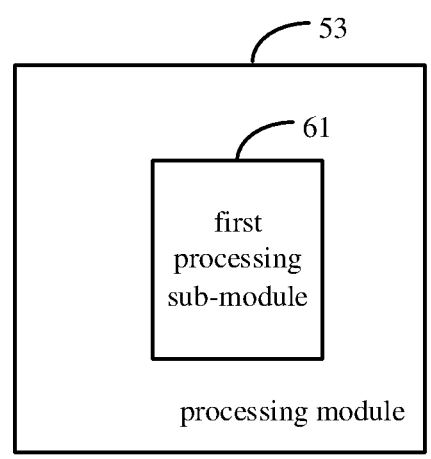
FIG. 6 is a block diagram of a device for implementing network connection according to an exemplary embodiment.

In an embodiment, the connection resume reject message may further include a UE state indicated by the base station. The UE state may be an idle state or an inactive state. As shown in FIG. 6, the processing module 53 may include a first processing sub-module 61. The first processing sub-module 61 may be configured to adjust a current state of the UE to be the UE state indicated by the base station.

In the embodiment, if the connection resume reject message sent by the base station includes a UE state indicated by the base station, the UE may adjust a state per se as indicated by the base station, thereby improving reliability of the network connection.

Figure 7:
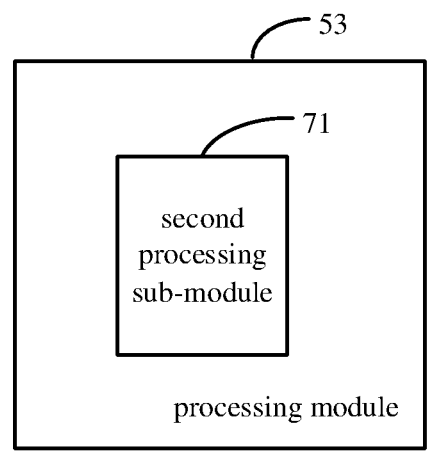
FIG. 7 is a block diagram of a device for implementing network connection according to an exemplary embodiment.

In an embodiment, the rejection cause that causes the base station to reject the connection resume request message may include at least one of the first rejection cause or the fourth rejection cause. As shown in FIG. 7, the processing module 53 may include a second processing sub-module 71. The second processing sub-module 71 may be configured to adjust a current state to be an idle state.

In the embodiment, the UE may simply adjust the current state to be an idle state when the rejection cause is at least one of the first rejection cause or the fourth rejection cause, without requiring the base station to indicate a target UE state, thus saving a signaling overhead.

Figure 8:
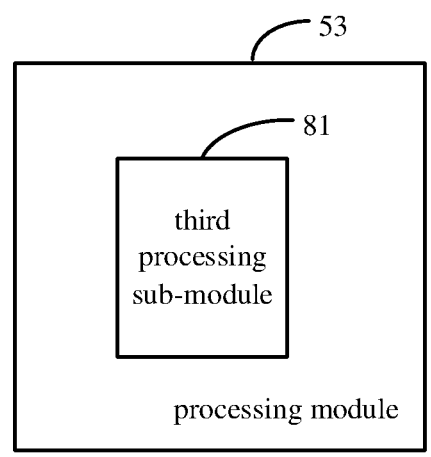
FIG. 8 is a block diagram of a device for implementing network connection according to an exemplary embodiment.

In an embodiment, the connection resume reject message may further include RNA information indicated by the base station. The RNA information may include a cell or area indicated by the base station. As shown in FIG. 8, the processing module 53 may include a third processing sub-module 81. The third processing sub-module 81 may be configured to save the RNA information, and exclude the cell or area indicated by the base station from consideration in cell reselection.

In the embodiment, the connection resume reject message sent by the base station may include RNA information indicated by the base station. The RNA information may include a cell or area indicated by the base station. The UE may then save the RNA information indicated by the base station, and exclude the cell or area indicated by the base station from consideration in cell reselection, thereby avoiding use of a cell or area indicated by the base station in cell reselection, improving reliability of cell reselection.

Figure 9:
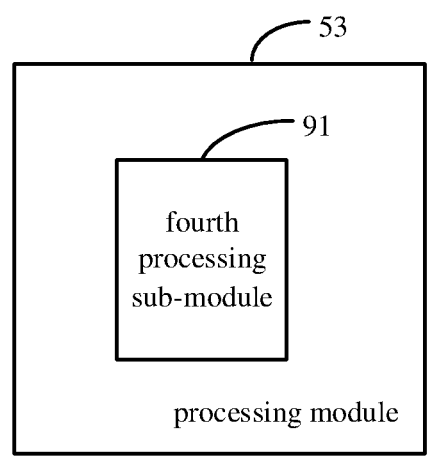
FIG. 9 is a block diagram of a device for implementing network connection according to an exemplary embodiment.

In an embodiment, the connection resume reject message may further include a wait time indicated by the base station. The wait time may be a time elapse before the UE resends the connection resume request message to the base station. As shown in FIG. 9, the processing module 53 may include a fourth processing sub-module 91. The fourth processing sub-module 91 may be configured to resend the connection resume request message to the base station after expiration of the wait time indicated by the base station.

In the embodiment, the connection resume reject message sent by the base station may include a wait time indicated by the base station. The UE may then resend the connection resume request message to the base station after expiration of the wait time indicated by the base station, such that the base station controls the frequency the UE sends the connection resume request message, avoiding a dilemma that the UE constantly sends connection resume request messages without actually resuming the connection, avoiding massive waste of resources of the UE, lowering power consumption by the UE.

Figure 10:
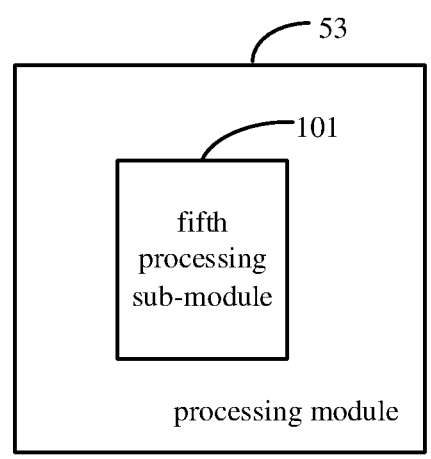
FIG. 10 is a block diagram of a device for implementing network connection according to an exemplary embodiment.

In an embodiment, as shown in FIG. 10, the processing module 53 may further include a fifth processing sub-module 101. The fifth processing sub-module 101 may be configured to, in response to at least one of a failure in integrity check on the connection resume reject message or a failure to decrypt the connection resume reject message, delete the connection resume reject message, and maintain an inactive state as a current state of the UE.

In the embodiment, the UE may delete the connection resume reject message and maintain a current state of an inactive state in response to at least one of a failure in integrity check on the connection resume reject message or a failure to decrypt the connection resume reject message, such that the UE can send another connection resume request message to a base station, improving efficiency of the network connection.

Figure 11:
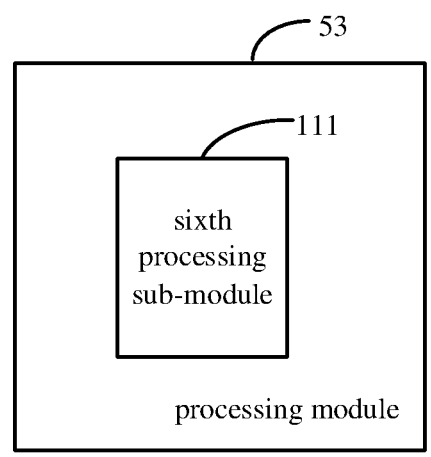
FIG. 11 is a block diagram of a device for implementing network connection according to an exemplary embodiment.

In an embodiment, as shown in FIG. 11, the processing module 53 may further include a sixth processing sub-module 111. The sixth processing sub-module 111 may be configured to, after adjusting the current state to an idle state, send a notification to a local Non-Access Stratum (NAS). The notification may include that the current state is the idle state. The notification may include the cause value indicating the rejection cause that causes the base station to reject the connection resume request message.

In the embodiment, after the current state has been adjusted to be an idle state, a notification may be sent to a local NAS. The notification may include that the current state is the idle state. The notification may include the cause value indicating the rejection cause that causes the base station to reject the connection resume request message, thereby improving reliability of the network connection.

The device embodiments described above exemplary. Modules described as separate parts may or may not be physically separate. The modules may be located in one place, or distributed over networks. Some or all of the modules may be selected as needed.

The present disclosure also provides a device for implementing network connection, which may apply to a base station. The device includes a processor and a memory storing instructions executable by the processor. The processor is configured to: receive a connection resume request message sent by UE; detect, according to the connection resume request message, that at least one rejection cause of rejecting connection resumption is met; and send a connection resume reject message to the UE, wherein the connection resume reject message carries a cause value indicating the at least one rejection cause.

Figure 12:
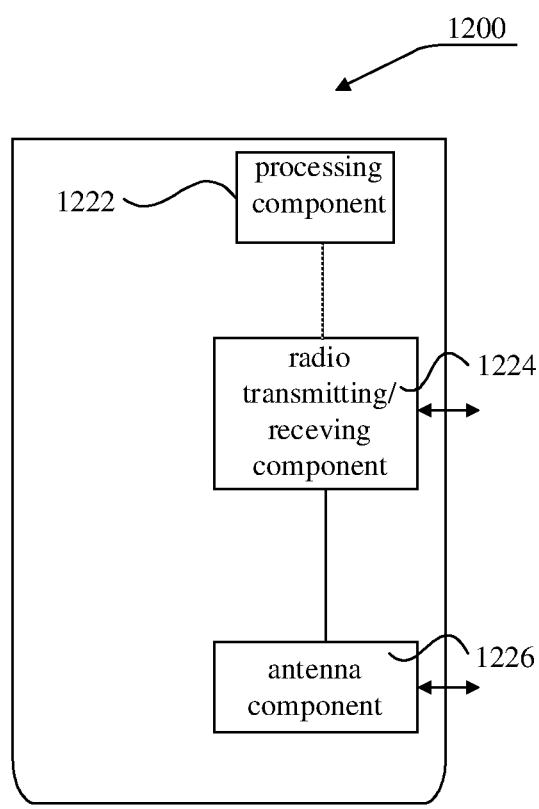
FIG. 12 is a schematic diagram of a device for implementing network connection according to an exemplary embodiment.

FIG. 12 is a schematic diagram of a device 1200 for implementing network connection according to an exemplary embodiment. The device 1200 may be provided as a base station. Referring to FIG. 12, the device 1200 includes a processing component 1222, a radio transmitting/receiving component 1224, an antenna component 1226, and a signal processing part dedicated to a radio interface. The processing component 1222 may further include one or more processors. A processor of the processing component 1222 may be configured to perform the above described methods for implementing network connection.

The present disclosure also provides a device for implementing network connection, which may apply to UE. The device includes a processor and a memory storing instructions executable by the processor. The processor is configured to: send a connection resume request message to a base station; receive a connection resume reject message sent by the base station, wherein the connection resume reject message carries a cause value indicating a rejection cause that causes the base station to reject the connection resume request message; and perform a processing operation corresponding to the connection resume reject message.

Figure 13:
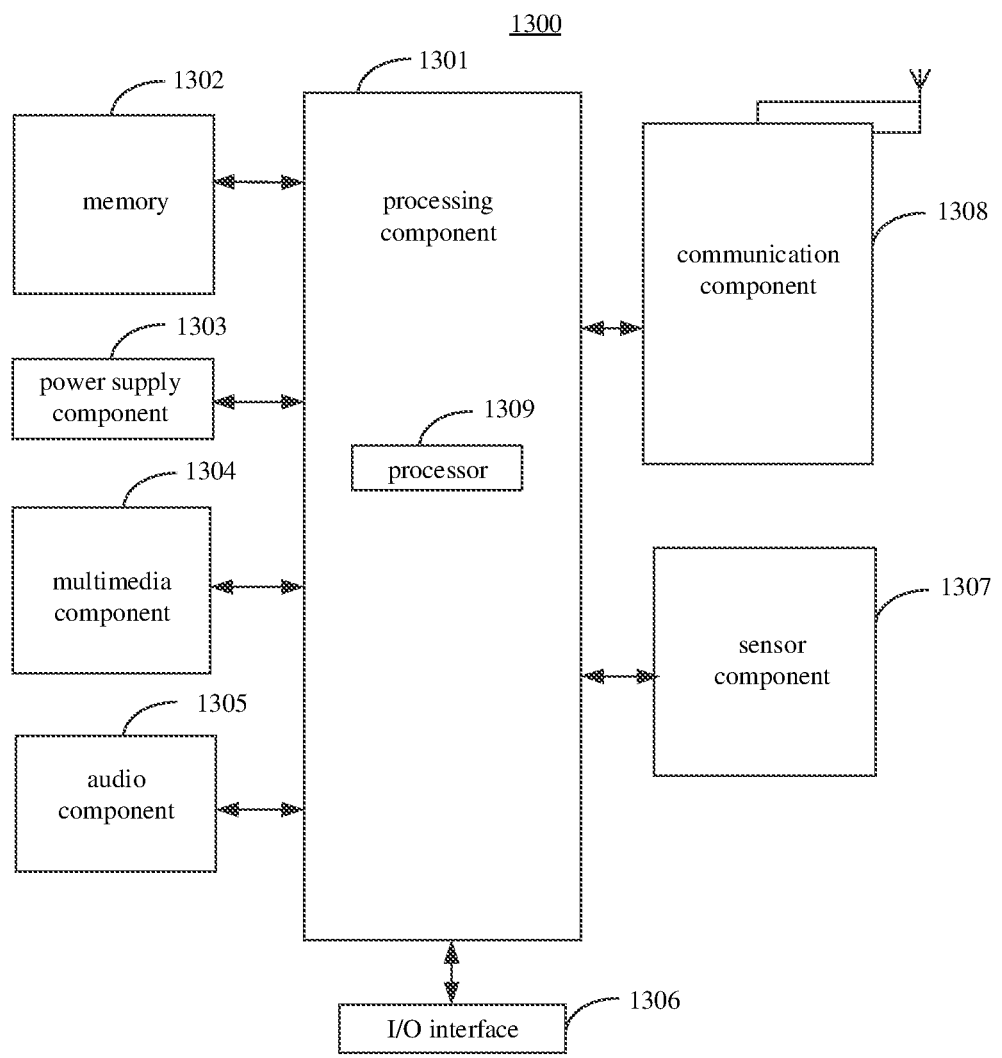
FIG. 13 is a schematic diagram of a device for implementing network connection according to an exemplary embodiment.

FIG. 13 is a schematic diagram of a device 1300 for implementing network connection according to an exemplary embodiment. The device 1300 may be UE, such as a computer, a mobile phone, a digital broadcast terminal, messaging equipment, a gaming console, tablet equipment, medical equipment, exercise equipment, a personal digital assistant, etc.

Referring to FIG. 13, the device 1300 may include at least one of: a processing component 1301, a memory 1302, a power supply component 1303, a multimedia component 1304, an audio component 1305, an Input/Output (I/O) interface 1306, a sensor component 1307, a communication component 1308, etc.

The processing component 1301 may generally control an overall operation of the device 1300, such as operations associated with display, a telephone call, data communication, a camera operation, a recording operation, etc. The processing component 1301 may include one or more processors 1309 to execute instructions so as to complete all or a part of an aforementioned method. In addition, the processing component 1301 may include one or more portions to facilitate interaction between the processing component 1301 and other components. For example, the processing component 1301 may include a multimedia portion to facilitate interaction between the multimedia component 1304 and the processing component 1301.

The memory 1302 may be configured to store various types of data to support the operation at the device 1300. Examples of such data may include instructions of any application or method for operating on the device 1300, contact data, phonebook data, messages, pictures, videos, etc. The memory 1302 may be realized by any type of transitory or non-transitory storage equipment or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 1303 may supply electric power to various components of the device 1300. The power supply component 1303 may include a power management system, one or more power sources, and other components related to generating, managing, and distributing electricity for the device 1300.

The multimedia component 1304 may include a screen that provides an output interface between the device 1300 and a user. The screen may include a Liquid Crystal Display (LCD), a Touch Panel (TP), etc. If the screen includes a TP, the screen may be realized as a touch screen to receive a signal input by a user. The TP may include one or more touch sensors for sensing touch, slide, and gestures on the TP. The one or more touch sensors not only may sense the boundary of a touch or slide move, but also detect the duration and pressure related to the touch or slide move. The multimedia component 1304 may include at least one of a front camera or a rear camera. When the device 1300 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 1305 may be configured to output and/or input an audio signal. For example, the audio component 1305 may include a microphone (MIC). When the device 1300 is in an operation mode such as a call mode, a recording mode, a voice recognition mode, etc., the MIC may be configured to receive an external audio signal. The received audio signal may be further stored in the memory 1302 or may be sent via the communication component 1308. The audio component 1305 may further include a loudspeaker configured to output the audio signal.

The I/O interface 1306 may provide an interface between the processing component 1301 and a peripheral interface portion. Such a peripheral interface portion may be a keypad, a click wheel, a button, etc. Such a button may include but is not limited to at least one of a homepage button, a volume button, a start button, or a lock button.

The sensor component 1307 may include one or more sensors for assessing various states of the device 1300. For example, the sensor component 1307 may detect an on/off state of the device 1300 and relative positioning of components such as the display and the keypad of the device 1300. The sensor component 1307 may further detect a change in the position of the device 1300 or of a component of the device 1300, whether there is contact between the device 1300 and a user, the orientation or acceleration/deceleration of the device 1300, a change in the temperature of the device 1300, etc. The sensor component 1307 may include a proximity sensor configured to detect existence of a nearby object without physical contact. The sensor component 1307 may further include an optical sensor such as a Complementary Metal-Oxide-Semiconductor (CMOS) or a Charge-Coupled-Device (CCD) image sensor used in an imaging application. The sensor component 1307 may further include an acceleration sensor, a gyroscope sensor, a magnetic sensor, a pressure sensor, a temperature sensor, etc.

The communication component 1308 may be configured to facilitate wired or wireless communication between the device 1300 and other equipment. The device 1300 may access a wireless network based on a communication standard such as Wi-Fi, 4G, 5G, or a combination thereof. The communication component 1308 may broadcast related information or receive a broadcast signal from an external broadcast management system via a broadcast channel. The communication component 1308 may include a Near Field Communication (NFC) portion for short-range communication. The communication component 1308 may be based on technology such as Radio Frequency Identification (RFID), Infrared Data Association (IrDA), Ultra-Wideband (UWB) technology, Bluetooth (BT), etc.

The device 1300 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

The present disclosure also provides a non-transitory computer-readable storage medium including instructions, such as instructions included in the memory 1302. The instructions may be executed by the processor 1309 of the device 1300 to implement the above described methods. For example, the non-transitory computer-readable storage medium may be Read-Only Memory (ROM), Random Access Memory (RAM), Compact Disc Read-Only Memory (CD-ROM), a magnetic tape, a floppy disk, optical data storage equipment, etc.

Other implementations will be apparent to a person having ordinary skill in the art that has considered the specification and practiced the subject disclosure. The disclosure is intended to cover any variation, use, or adaptation of the disclosure following the general principles of the disclosure and including such departures from the disclosure as come within common knowledge or customary practice in the art. The embodiments are exemplary only, with a true scope and spirit of the disclosure being indicated by the appended claims.

The disclosure is not limited to the exact construction that has been described above and illustrated in the accompanying drawings, and various modifications and changes can be made to the disclosure without departing from the scope of the disclosure. It is intended that the scope of the disclosure is limited only by the appended claims.

What is claimed is:

1. A method for implementing network connection resumption rejection, applied to a base station, the method comprising:
   receiving a connection resume request message sent by user equipment (UE);
   detecting, according to the connection resume request message, that at least one rejection cause of rejecting connection resumption is met; and
   sending a connection resume reject message to the UE, wherein the connection resume reject message carries a cause value indicating the at least one rejection cause,
   wherein the at least one rejection cause comprises at least one of a first rejection cause, a second rejection cause, a third rejection cause, or a fourth rejection cause,
   the first rejection cause represents a failure in integrity check on the connection resume request message,
   the second rejection cause represents that a Radio Access Network based Notification Area (RNA) that the UE requests to access prohibits access by the UE,
   the third rejection cause represents a network overload, and
   the fourth rejection cause represents a failure to acquire a UE context and the network overload,
   wherein the connection resume reject message further comprises a UE state indicated by the base station, the UE state being one of an idle state or an inactive state, the UE state indicating that the UE is to adjust a current state of the UE to the UE state indicated by the base station,
   wherein the connection resume reject message further comprises RNA information indicated by the base station, the RNA information comprising a cell or area indicated by the base station that is to be excluded from cell reselection for the UE.

2. The method of claim 1, wherein the connection resume reject message further comprises at least one of a wait time indicated by the base station, a setting of a lowest reselection priority indicated by the base station, a priority of reselecting a respective frequency indicated by the base station, a redirection frequency indicated by the base station, or a redirection cell indicated by the base station,
   the wait time is a time elapse before the UE resends the connection resume request message to the base station,
   the setting comprises setting the lowest reselection priority for reselecting a frequency or standard of a cell where the UE is camping, or not setting the lowest reselection priority for reselecting a frequency or standard of a cell where the UE is camping,
   the respective frequency is a distinct frequency configured for the UE by the base station,
   the redirection frequency is a frequency to which the UE is to be redirected, and
   the redirection cell is a cell covered by the frequency to which the UE is to be redirected.

3. A method for implementing network connection resumption rejection, applied to user equipment (UE), the method comprising:
   sending a connection resume request message to a base station;
   receiving a connection resume reject message sent by the base station, wherein the connection resume reject message carries a cause value indicating at least one rejection cause that causes the base station to reject the connection resume request message; and
   performing a processing operation corresponding to the connection resume reject message,
   wherein the at least one rejection cause comprises at least one of a first rejection cause, a second rejection cause, a third rejection cause, or a fourth rejection cause,
   the first rejection cause represents a failure in integrity check on the connection resume request message,
   the second rejection cause represents that a Radio Access Network based Notification Area (RNA) that the UE requests to access prohibits access by the UE,
   the third rejection cause represents a network overload, and
   the fourth rejection cause represents a failure to acquire a UE context and the network overload,
   wherein the connection resume reject message further comprises a UE state indicated by the base station, the UE state being one of an idle state or an inactive state, and
   the performing a processing operation corresponding to the connection resume reject message comprises:
   adjusting a current state of the UE to be the UE state indicated by the base station,
   wherein the connection resume reject message further comprises RNA information indicated by the base station, the RNA information comprising a cell or area indicated by the base station, and
   the performing a processing operation corresponding to the connection resume reject message comprises:
   saving the RNA information, and excluding the cell or area indicated by the base station from cell reselection.

4. The method of claim 3, wherein the at least one rejection cause comprises at least one of the first rejection cause or the fourth rejection cause, and
   the performing a processing operation corresponding to the connection resume reject message comprises:
   adjusting the current state of the UE to be the idle state.

5. The method of claim 3, wherein the connection resume reject message further comprises a wait time indicated by the base station, the wait time being a time elapse before the UE resends the connection resume request message to the base station, and the performing a processing operation corresponding to the connection resume reject message comprises:
resending the connection resume request message to the base station after expiration of the wait time indicated by the base station.

6. The method of claim 3, wherein the performing a processing operation corresponding to the connection resume reject message comprises:
in response to at least one of a failure in integrity check on the connection resume reject message or a failure to decrypt the connection resume reject message, deleting the connection resume reject message, and maintaining the inactive state as the current state of the UE.

7. The method of claim 3, wherein the performing a processing operation corresponding to the connection resume reject message further comprises:
after adjusting the current state to the idle state, sending a notification to a local Non-Access Stratum (NAS), wherein the notification comprises the cause value indicating the at least one rejection cause, and that the current state is the idle state.

8. A base station, comprising:
a processor; and
a memory storing instructions executable by the processor,
wherein the processor is configured to perform the method of claim 1.

9. User equipment (UE), comprising:
a processor; and
a memory storing instructions executable by the processor,
wherein the processor is configured to:
send a connection resume request message to a base station;
receive a connection resume reject message sent by the base station, wherein the connection resume reject message carries a cause value indicating at least one rejection cause that causes the base station to reject the connection resume request message; and
perform a processing operation corresponding to the connection resume reject message,
wherein the at least one rejection cause comprises at least one of a first rejection cause, a second rejection cause, a third rejection cause, or a fourth rejection cause,
the first rejection cause represents a failure in integrity check on the connection resume request message,
the second rejection cause represents that a Radio Access Network based Notification Area (RNA) that the UE requests to access prohibits access by the UE,
the third rejection cause represents a network overload, and
the fourth rejection cause represents a failure to acquire a UE context and the network overload,
wherein the connection resume reject message further comprises a UE state indicated by the base station, the UE state being one of an idle state or an inactive state, and
the processor is further configured to adjust a current state of the UE to be the UE state indicated by the base station,
wherein the connection resume reject message further comprises RNA information indicated by the base station, the RNA information comprising a cell or area indicated by the base station, and
the processor is further configured to save the RNA information, and exclude the cell or area indicated by the base station from cell reselection.

10. The UE of claim 9, wherein the at least one rejection cause comprises at least one of the first rejection cause or the fourth rejection cause, and
the processor is further configured to adjust the current state of the UE to be the idle state.

11. The UE of claim 9, wherein the connection resume reject message further comprises a wait time indicated by the base station, the wait time being a time elapse before the UE resends the connection resume request message to the base station, and
the processor is further configured to resend the connection resume request message to the base station after expiration of the wait time indicated by the base station.

12. The UE of claim 9, wherein the processor is further configured to, in response to at least one of a failure in integrity check on the connection resume reject message or a failure to decrypt the connection resume reject message, delete the connection resume reject message, and maintain the inactive state as the current state of the UE.

* * * * *